(12) United States Patent
Sterner et al.

(10) Patent No.: US 6,502,367 B1
(45) Date of Patent: Jan. 7, 2003

(54) BAG CLOSING APPARATUS

(75) Inventors: Keith W. Sterner, Bath, PA (US); Dennis E. Graham, Bethlehem, PA (US); John F. Simonof, Jr., Easton, PA (US); David R. Gill, Stewartsville, NJ (US)

(73) Assignee: Flexicon Corporation, NJ (US)

( * ) Notice: Subject to any disclaimer, the term of this patent is extended or adjusted under 35 U.S.C. 154(b) by 0 days.

(21) Appl. No.: 09/558,706

(22) Filed: Apr. 26, 2000

(51) Int. Cl.⁷ .............................. B65B 7/00; B65B 51/00
(52) U.S. Cl. ................... 53/370.6; 53/138.3; 53/138.7; 53/370
(58) Field of Search ............................. 53/135.3, 138.6, 53/138.7, 138.8, 138.4, 139.1, 370

(56) References Cited

U.S. PATENT DOCUMENTS 5,121,682 A * 6/1992 Parker et al. ............... 53/138.8
5,787,689 A * 8/1998 Dearing ........................ 53/492
5,918,447 A * 7/1999 Hanten et al. .............. 53/138.4

FOREIGN PATENT DOCUMENTS

DE 1882434 * 11/1963

OTHER PUBLICATIONS

GEL—Verfahrenstechnik mbH Brochure entitled "Handling–Gerät zur Teilentleerung von BIG–BAGs", publication date unknown.

* cited by examiner

Primary Examiner—Rinaldi I. Rada
Assistant Examiner—Hemant M Desai
(74) Attorney, Agent, or Firm—Volpe and Koenig, P.C.

(57) ABSTRACT

A bag closing apparatus including a frame structure, a cinching assembly and an actuator assembly. The cinching assembly includes at least three pivot arms, each pivot arm including an arcuate portion and pivotably connected to the frame structure. The pivot arms are located relative to each to define a confined closure area. The actuator assembly includes a plurality of actuators for moving the pivot arms between spread positions and closed positions wherein the closure area has a smaller area.

17 Claims, 8 Drawing Sheets

BAG CLOSING APPARATUS

BACKGROUND

The present invention relates to the unloading of bulk bags used as containers for dry or moist particulate materials. The present invention more particularly relates to the unloading of bulk bag containers fabricated from cloth like material, such as woven polyester material, which is usually sewn in a cubical configuration.

Bulk bags made of heavy cloth material have been known in the art for sometime. It has also been known to provide the bag with heavy corner straps which support the bag when it is hung in a tower like support frame. The opposite end of the bag typically has a central outlet spout which is aligned with a discharge unit, for example a conveyer, hopper or the like, into which the material in the bag is intended to be discharged. Prior to discharge, the spout is maintained in a closed position, typically by tying-off of the spout.

To discharge the bag, the bag is hung in the support frame and the spout engaged with the discharge unit. The spout is opened and the particulate material flows via gravity through the spout. It is often desirable to control flow of material from the spout, for example, to permit batch weighing or to permit re-tying of the bag. Various types of bag closing devices, examples of which are illustrated in FIGS. 1–3, have been employed. In the device of FIG. 1, opposed bars, either flat or cylindrical, are moved together by fluid cylinders. As the spout is closed, it flattens in the direction of the arrows in FIG. 1. As a result, the flattened, wide spout is difficult to re-tie, particular if the spout is short. The device of FIG. 2 attempts to overcome such by providing substantially v-shaped opposed bars, as described in U.S. Pat. No. 5,787,689. However, at the two points of overlap between the opposed bars, the bag is susceptible to pinching which may cut the bag or the bag may roll out between the overlapped bars. Referring to FIG. 3, a "claw" like device is shown. The bag is again susceptible to pinching in such a device. Additionally, in some applications, for example where the particulate material is dense, a significant amount of torque is required to closed the opposed claw members.

Accordingly, there is a need for an apparatus which assists in restricting a bag spout while reducing the likelihood of pinching of the spout.

SUMMARY

The present invention provides a bag closing apparatus including a frame structure, a cinching assembly and an actuator assembly. The cinching assembly includes at least three pivot arms, each pivot arm including an arcuate portion and pivotably connected to the frame structure. The pivot arms are located relative to each other such that each pivot arm crosses at least two other pivot arms to define a confined closure area. The actuator assembly includes a plurality of actuators for moving the pivot arms between spread positions wherein the closure area has a predetermined area and closed positions wherein the closure area has a smaller area.

BRIEF DESCRIPTION OF THE DRAWING(S)

DETAILED DESCRIPTION OF THE PREFERRED EMBODIMENT

Figure 1:
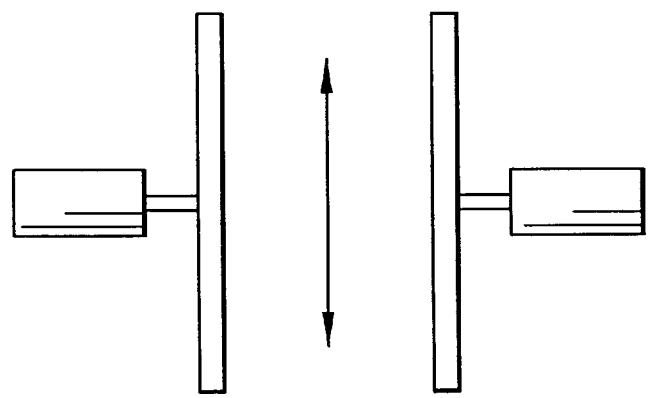
FIGS. 1–3 are top plan views of prior art bag closing devices.
Figure 2:
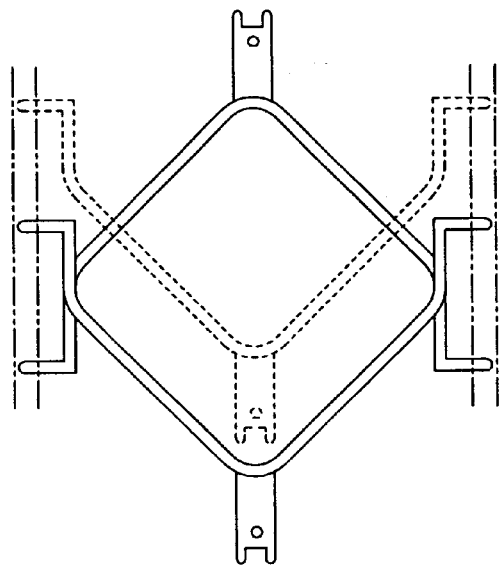
Figure 3:
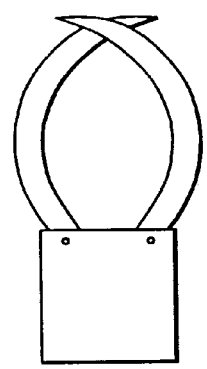
Figure 4:
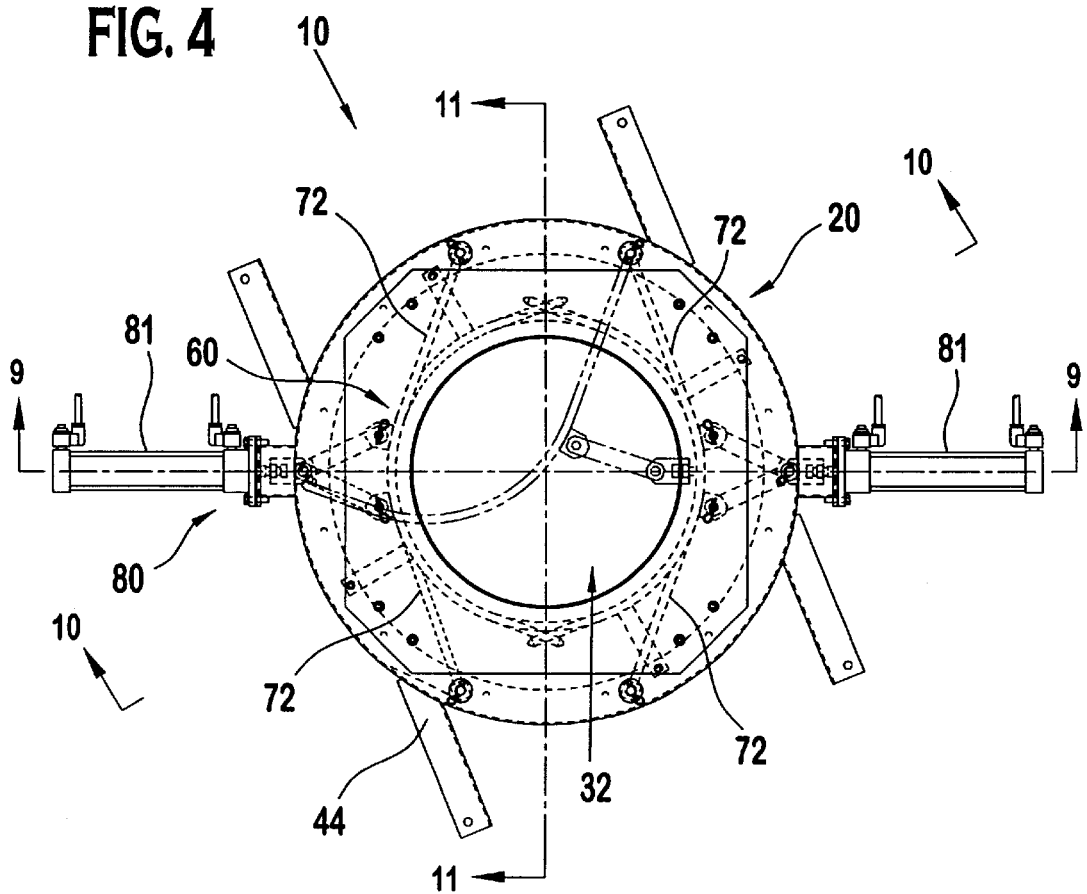
FIG. 4 is a top plan view of the preferred embodiment of the present invention.

The preferred embodiment of the present invention will be described with reference to the drawing figures where like numerals represent like elements throughout.

Figure 5:
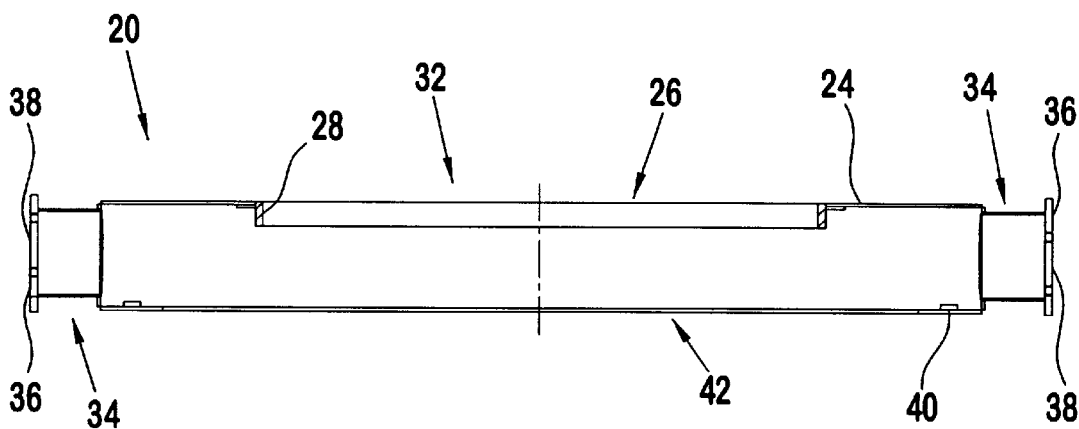
FIG. 5 is a cross-sectional view of the housing of the preferred embodiment of the present invention.
Figure 6:
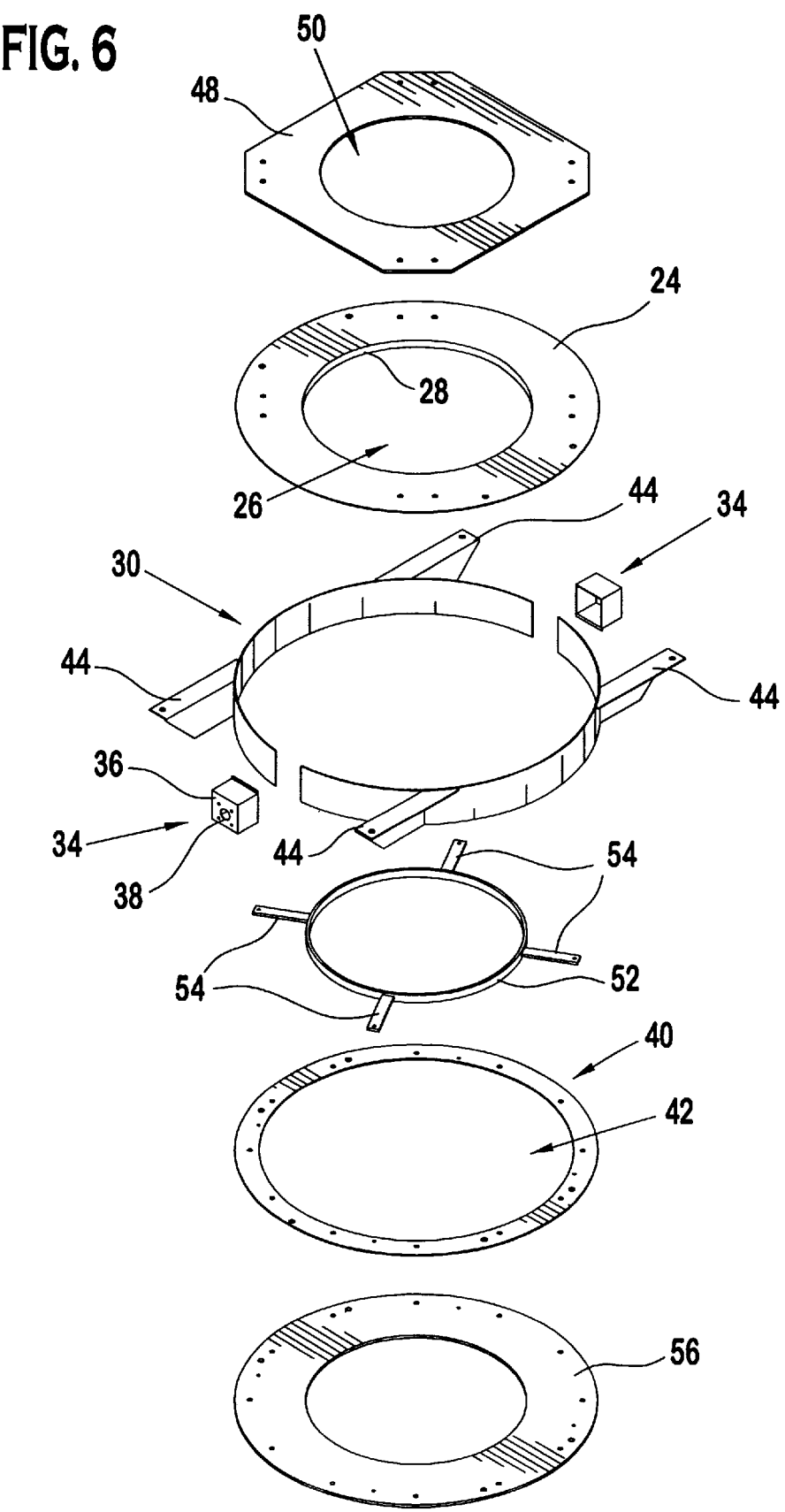
FIG. 6 is an exploded view of the housing of the preferred embodiment of the present invention.

Referring to FIGS. 4–11, the preferred embodiment 10 of the present invention is shown. The bag closing apparatus 10 comprises a housing 20 and a cinching assembly 60. Referring to FIGS. 5 and 6, the preferred housing 20 includes a split cylindrical body 30 secured between round top and bottom plates 24 and 40. The plates have coaxial apertures 26 and 42 such that a cylindrical path 32 extends through the housing 20. A plurality of mounting brackets 44 extend from the cylindrical body 30 for mounting the apparatus 10 on a frame (not shown) or other discharge unit (not shown). The body 30, plates 24, 40 and brackets 44 are preferably manufactured from sheet metal of approximately 10 or 12 gauge.

A pair of cylinder mounting boxes 34 are secured to the housing 20 in alignment with the open areas 31 of the split housing body 30. Each box 34 has a mounting plate 36 with an aperture 38 extending therethrough. As will be described in more detail hereinafter, a fluid cylinder 81 is mounted to each mounting plate 36 with its piston rod 82 aligned with the respective aperture 38. The boxes 34 are preferably manufactured from 14 gauge sheet metal and the plates 36 from one-quarter inch (¼") steel bar. The top and bottom plates 24,40, the body 30, the brackets 44, the boxes 34, and the mounting plates 36 are preferably welded together, but may be secured by other means.

A support ring 52 is preferably secured to the bottom plate 40 by a plurality of flanges 54 extending therefrom. The support ring 52 is preferably manufactured from a half inch (½") steel rod and finished smooth on its upper surface. The support ring 52 provides support and a smooth guide surface for the pivot arms 72 as will be described in more detail hereinafter. A ring 28 depends from the top plate 24 about the aperture 26. The ring 28 also provides a smooth guide surface for the pivot arms 72 as will be described in more detail hereinafter.

A removable support plate 48 with an aperture 50 therethrough may be attached to the top plate 24 with the apertures 50 and 26 coaxially aligned. The support plate aperture 50 is preferably sized to the dimension of the bag spout, i.e., if the spout has a sixteen inch (16") diameter, the support plate aperture 50 will have a slightly oversized diameter. The support plate 48 thereby helps prevent sagging of the bag portion into the closing apparatus 10. If a different size spout is used, the support plate 48 can be interchanged. An apertured guard 56 may be secured to the bottom plate 40 to help prevent unwanted objects from entering the apparatus 10. The support plate 48 and the guard 56 are preferably manufactured from one-quarter inch (¼") high density polyethylene.

Figure 7:
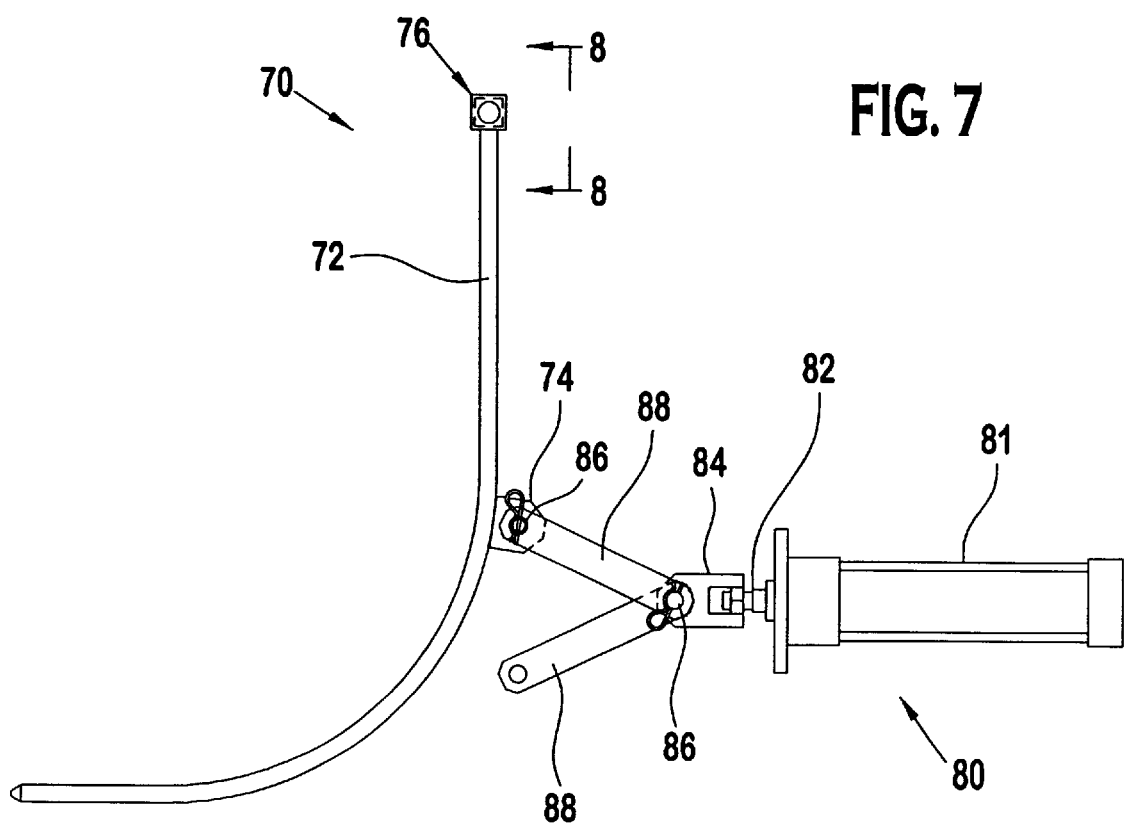
FIG. 7 is a top plan view of a pivot arm assembly of the preferred embodiment of the present invention.
Figure 8:
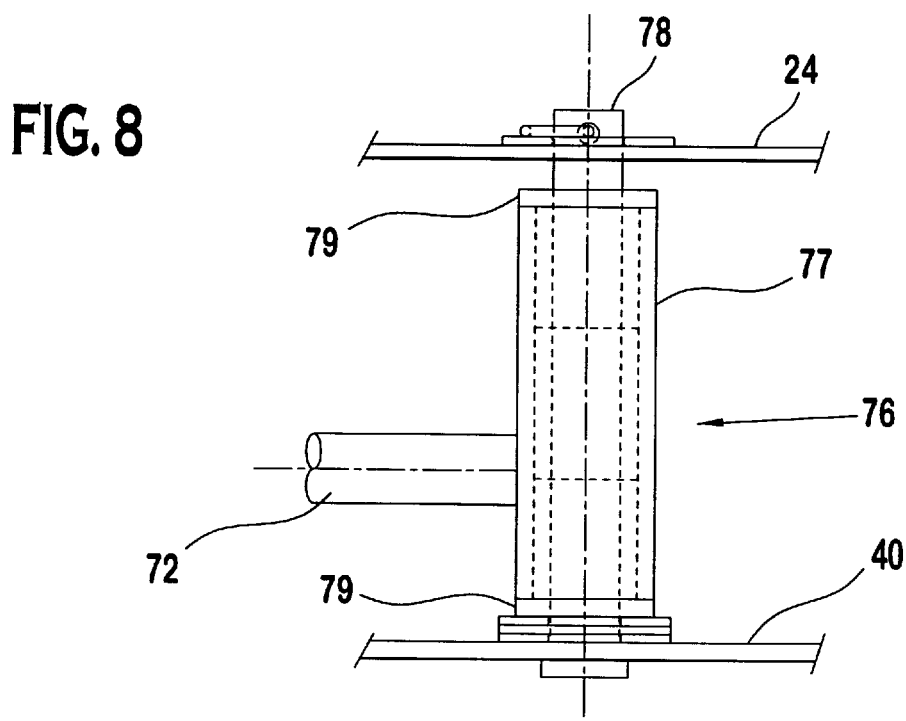
FIG. 8 is a side elevation view of a portion of the pivot arm assembly along the line 8—8 in FIG. 7.

The cinching assembly 60 will be described with reference to FIGS. 7–11. The preferred cinching assembly 60 comprises four pivot arm assemblies 70 and a pair of actuator assemblies 80, although fewer or more of each may be utilized. Referring to FIGS. 7 and 8, each pivot arm assembly 70 includes a substantially J-shaped pivot arm 72 extending from a pivot tube 76. The pivot arms 72 are preferably manufactured from half inch (½") steel rod and may be provided with a tapered tip. A link tab 74 extends from each pivot arm 72 for interconnection with a respective actuator assembly 80. Each pivot tube 76 includes a hollow body 77 upon which a respective pivot arm 72 is mounted. A shaft 78 extends through the hollow body 77 and is pivotably secured with respect to the top and bottom plates 24, 40. Bushings 79 or the like may be utilized about the shaft 78.

The preferred actuator assemblies 80 include fluid actuated cylinders 81 in communication with an air supply line or the like (not shown). A piston rod 82 extends from the cylinder 81 and is connected to an attachment plate 84. A pair of link bars 88, one above and one below, are pivotably connected to the attachment plate 84 via a pin 86 or the like. The opposite ends of the link bars 88 are then pivotably connected to a link tab 74 extending from a respective pivot arm 72. By securing one link bar 88 above and one below the attachment plate 84, the link bars 88 properly align with the link tabs 74 of the pivot arms 72 which are at different elevations. Alternatively, one actuator assembly 80 may be utilized for each pivot arm assembly 70.

Figure 9:
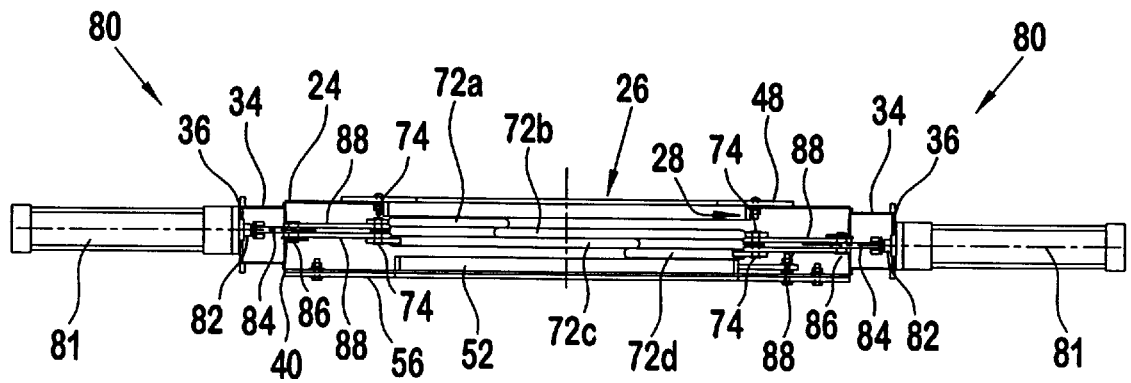
FIG. 9 is a cross-sectional view along the line 9—9 in FIG. 4.
Figure 10:
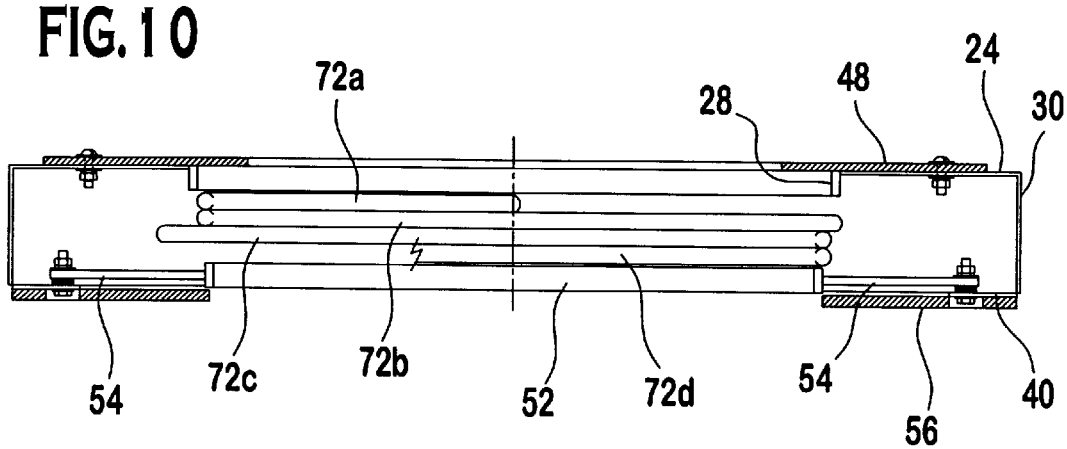
FIG. 10 is a cross-sectional view along the line 10—10 in FIG. 4.
Figure 11:
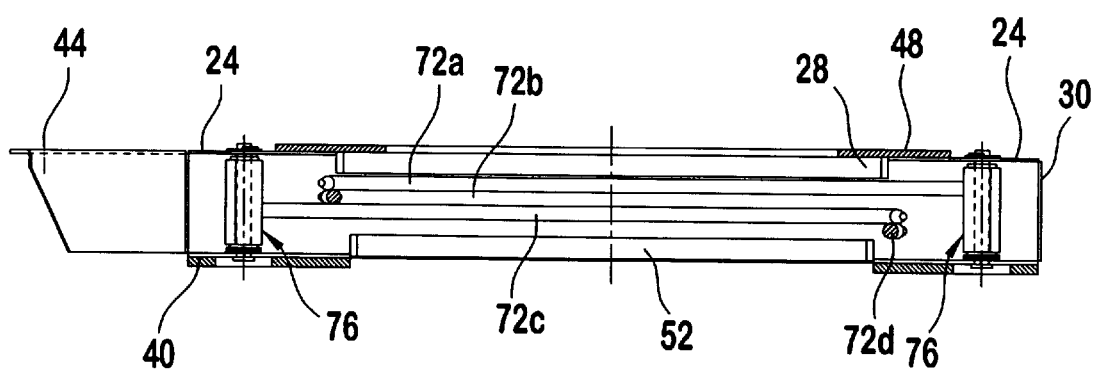
FIG. 11 is a cross-sectional view along the line 11—11 in FIG. 4.

Referring to FIGS. 9–11, the four pivot arms 72a–72d are stacked one upon the other and upon the support ring 52. The support ring 52 and top ring 28 are preferably spaced such that the pivot arms 72a–72d abut, as shown in FIG. 10, but remain slidable relative to one another. The abutting relationship helps prevent the spout from moving between adjacent pivot arms 72. Referring to FIG. 11, the pivot arms 72a–72d are mounted at different heights on their respective pivot tubes 76 to provide proper alignment. Additionally, to provide proper alignment of the fluid actuated cylinders 81, such are preferably mounted off-set from one another. As shown in FIG. 9, the higher mounted cylinder 81 actuates pivot arms 72a and 72c and the lower mounted air cylinder 81 actuates pivot arms 72b and 72d.

Figure 12:
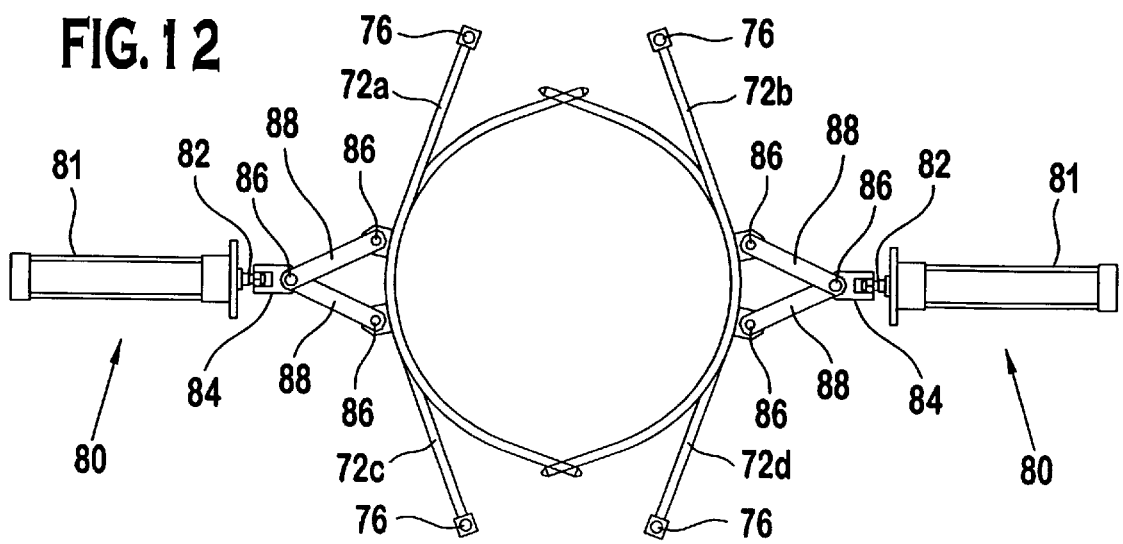
FIGS. 12–14 are top plan views illustrating the cinching sequence of the cinching assembly of the preferred embodiment of the present invention.
Figure 13:
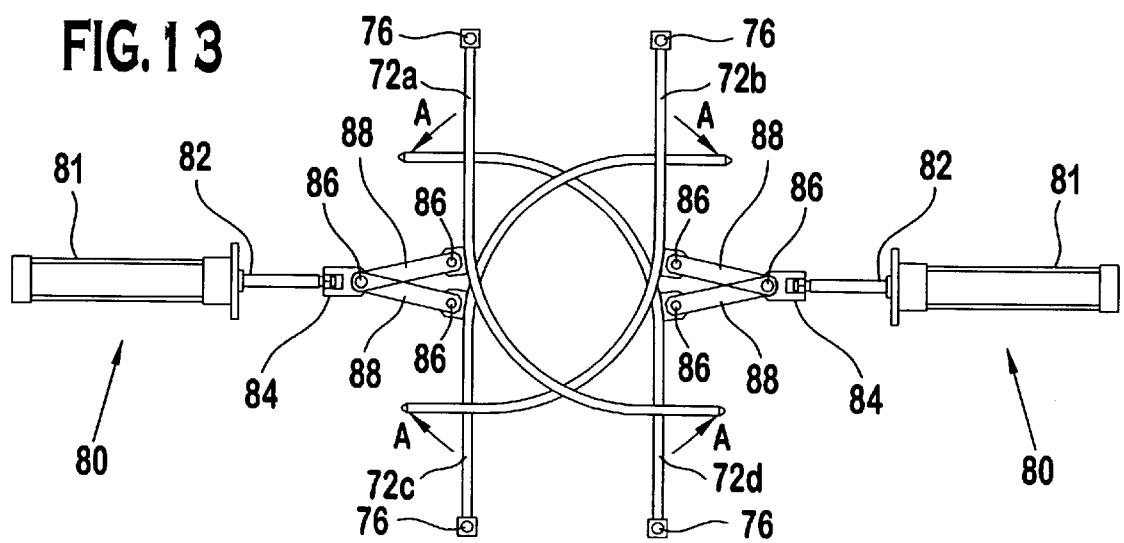
Figure 14:
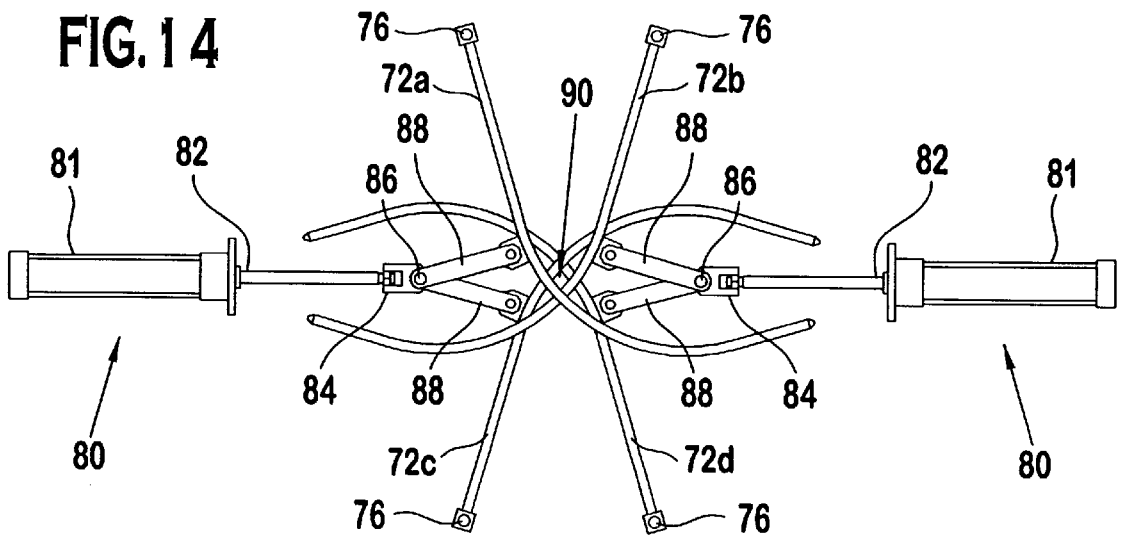
Figure 16:
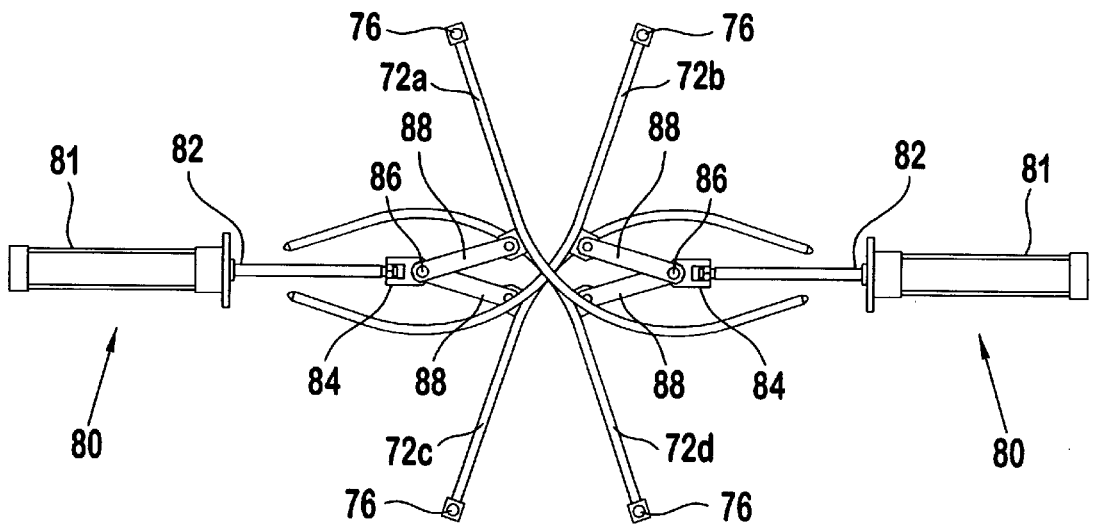
FIG. 16 is a top plan view illustrating the cinching assembly with the pivot arms extended to a position beyond the central region, shown in FIG. 14, to an overlapped position.

The cinching sequence will now be described with reference to FIGS. 12–14. Referring to FIG. 12, the actuator assemblies 80 are non-energized and the pivot arms 72 are in an open, generally circular configuration. In this configuration, a spout can be passed through the assembly 10 and engaged with a discharge unit. When it is desired to close the spout, the fluid cylinders 81 are actuated to extend the rods 82. The pivotably connected link bars 88 translate the linear force to move the pivotably connected pivot bars 72 along an arcuate path as represented by the arrows A in FIG. 13. The arcuate path and the curvature of the pivot arms 72 minimizes the potential for pinching of the spout. Actuation of the cylinders 81 continues as the pivot arms 72 constrict the bag to a central region 90. The pivot arms 72 are then extended to a position beyond the central region 90, as shown in FIG. 16, and overlap such that the bag spout forms a "Z" as it travels between the pivot arms 72. The over extension is preferred, but may not be required in all applications.

Figure 15:
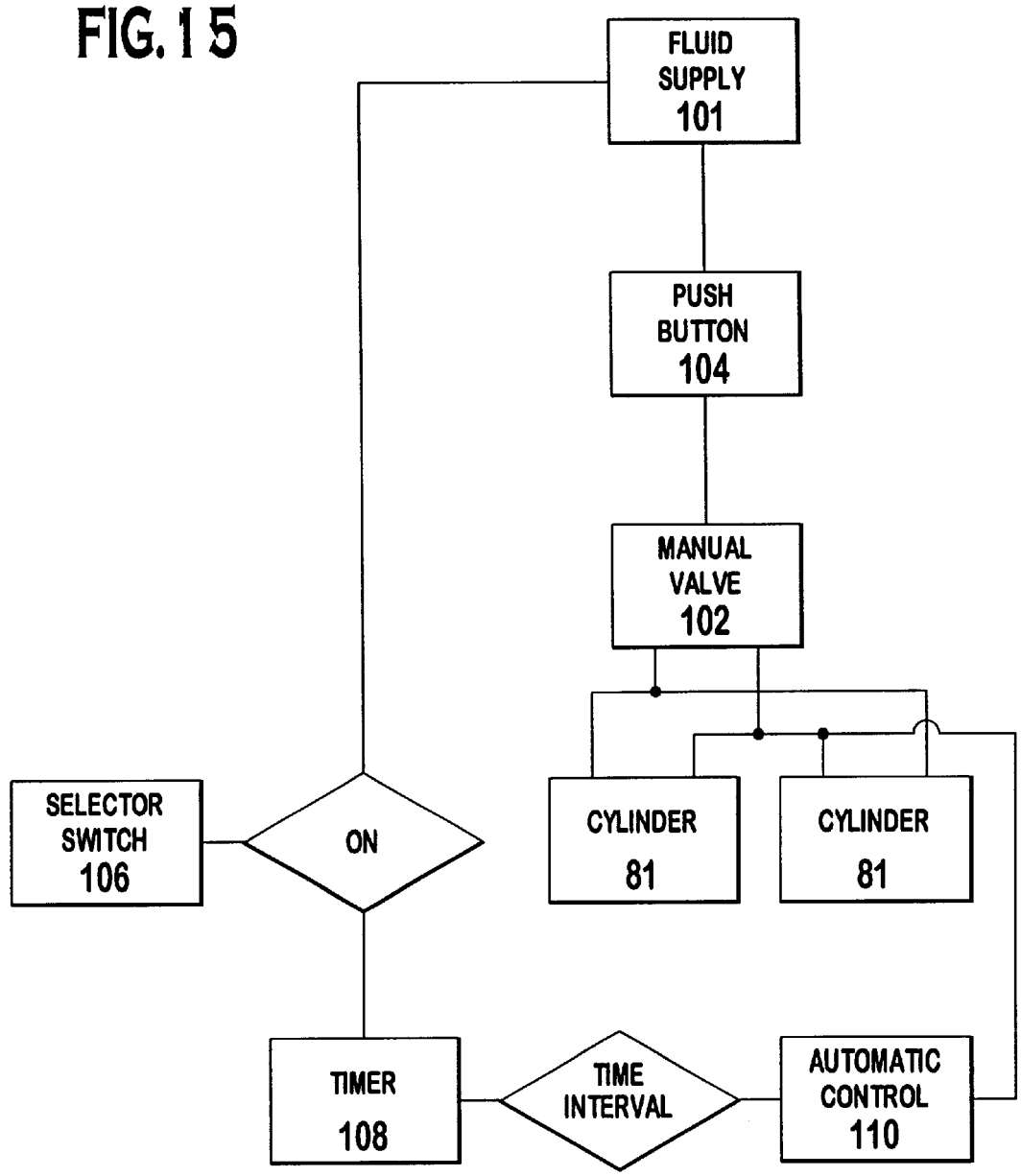
FIG. 15 is a flow diagram of the preferred operating system of the present invention.

The preferred operating system 100 of the closing assembly 10 will be described with reference to FIG. 15. The preferred operating system 100 includes a manual valve 102, a safety push button 104, a selector switch 106, a timer 108, and an automatic control 110. The manual valve 102 controls the flow of fluid into the cylinders 81 and is moveable between a nuetral position and "close" and "open" positions wherein fluid is provided to the cylinders 81 to extend or retract the rods 82. To operate the assembly 10 manually, an operator uses the manual valve 102 to control flow into and out of the cylinder 81 as desired. The system 100 also preferably includes a safety push button 104 which closes the fluid supply 101 unless engaged. If either the push button 104 or valve 102 is released, pressure to the cylinder 81 will cease. As such, the operator must use one hand to engage the push button 104 and the other to operate the manual valve 102, thereby reducing the likelihood the operator will inadvertently place a hand in the path of the moving components.

In some instances, an operator may want to remove one or both hands while maintaining pressure in the cylinder 81, for example, to retie the spout. As such, the preferred system 100 also includes an automatic control 110. To utilize the automatic control 110, the selector switch 106 must be in the "auto" position. If the switch 106 is in the "auto" position, the timer 108 will time the duration the manual valve 102 is in the "close" position. If the manual valve 102 is in the "close" position for a given time interval, for example five seconds, the timer 108 will trigger the automatic control 110. The automatic control 110 will then continue to supply fluid pressure to the cylinder 81, irrespective of whether the manual valve 102 or push button 104 are engaged, until the operator moves the selector switch 106 to a "manual" position. With the selector switch in the "manual" position, the operator can use the manual valve 102 to open the cinching assembly 60. Other manual and automatic operating systems may also be used.

What is claimed is:

1. A bag closing apparatus comprising:
   a frame structure;
   at least three pivot arms, each pivot arm having first and second ends and an arcuate portion therebetween, pivotably connected to the frame structure adjacent one end thereof and located relative to each other such that each pivot arm crosses at least two other pivot arms to define a confined closure area; and
   actuation means for moving the pivot arms between spread positions wherein the closure area has a predetermined area and closed positions wherein at least one pivot arm extends past at least one of the other pivot arms in the closure area to an overlapped position completely closing off the predetermined area.

2. The apparatus of claim 1 wherein each of the pivot arms is mounted of at a different elevation such that the pivot arms are stacked.

3. The apparatus of claim 1 comprising four pivot arms.

4. The apparatus of claim 1 wherein the closure area has a substantially circular configuration with the pivot arms in the spread positions.

5. The apparatus of claim 1 wherein in the closed positions, the pivot arms are moved beyond a central region to overlap one another and pass the closure area.

6. The apparatus of claim 1 wherein the actuator means includes a plurality of actuator assemblies, each including a fluid cylinder with an extendable rod.

7. The apparatus of claim 6 wherein each pivot arm has a link tab extending therefrom which is pivotably coupled with a first end of a link bar, a second end of the link bar coupled to an attachment portion of a respective rod.

8. The apparatus of claim 7 wherein two link bars are pivotably coupled to the attachment portion of a respective rod such that the rod actuates a pair of pivot arms.

9. The apparatus of claim 1 wherein the frame structure includes a cylindrical housing.

10. The apparatus of claim 9 wherein the housing includes a cylindrical body extending between opposed top and bottom plates.

11. The apparatus of claim 10 wherein the top and bottom plates have an aperture therethrough and the apertures are coaxial to define a cylindrical passage through the housing.

12. The apparatus of claim 10 wherein the housing further comprises a support ring secured proximate the bottom plate such that a lower one of the pivot arms is tangential thereto.

13. The apparatus of claim 12 wherein a ring member depends from the top plate such that an upper one of the pivot arms is tangential thereto.

14. The apparatus of claim 13 wherein the pivot arms have a combined vertical dimension and the support ring and ring member are spaced a distance approximate the combined vertical dimension.

15. The apparatus of claim 10 wherein the housing further comprises an removable support plate having an aperture therethrough.

16. The apparatus of claim 1, further comprising a bag located in the bag closing apparatus having a bag spout which extends through the confined closure area, and wherein in the closed positions, the pivot arms are extended to a position beyond a central region and overlap such that the bag spout forms a "Z" as it extends between the pivot arms.

17. A bag closing apparatus for a bulk bag unloading device, comprising:

a frame structure;

at least three pivot arms, each pivot arm having first and second ends and an arcuate portion therebetween, each of the pivot arms has a substantially J-shaped configuration so that the pivot arms are curved over an entire bag contact area, the arms each being pivotably connected to the frame structure adjacent one end thereof and located relative to each other such that each pivot arm crosses at least two other pivot arms to define a confined closure area; and actuation means for moving the pivot arms between spread positions wherein the closure area has a predetermined area which includes a central region and closed positions wherein the pivot arms are extended to a position beyond the central region and the closure area is completely closed off.

* * * * *

UNITED STATES PATENT AND TRADEMARK OFFICE
CERTIFICATE OF CORRECTION

PATENT NO.     : 6,502,367 B1
DATED          : January 7, 2003
INVENTOR(S)    : Sterner et al.

It is certified that error appears in the above-identified patent and that said Letters Patent is hereby corrected as shown below:

Column 4,
Line 59, after the word "mounted", delete the word "of".

Column 5,
Line 30, after the word "comprises", delete the word "an", and insert therefor -- a --.

Signed and Sealed this

Nineteenth Day of August, 2003

JAMES E. ROGAN
*Director of the United States Patent and Trademark Office*